(12) United States Patent
Bappe et al.

(10) Patent No.: US 7,904,681 B1
(45) Date of Patent: Mar. 8, 2011

(54) METHODS AND SYSTEMS FOR MIGRATING DATA WITH MINIMAL DISRUPTION

(75) Inventors: Michael E. Bappe, Loveland, CO (US); Helen S. Raizen, Jamaica Plain, MA (US)

(73) Assignee: EMC Corporation, Hopkinton, MA (US)

( * ) Notice: Subject to any disclaimer, the term of this patent is extended or adjusted under 35 U.S.C. 154(b) by 18 days.

(21) Appl. No.: 11/427,889

(22) Filed: Jun. 30, 2006

(51) Int. Cl.
*G06F 12/02* (2006.01)
(52) U.S. Cl. ... 711/162; 711/149; 711/165; 711/E12.002
(58) Field of Classification Search .................. 711/162, 711/209, E12.016
See application file for complete search history.

(56) References Cited

U.S. PATENT DOCUMENTS

| | | | | |
|---|---|---|---|---|
| 6,266,740 | B1* | 7/2001 | Don et al. | 711/114 |
| 6,629,189 | B1* | 9/2003 | Sandstrom et al. | 711/4 |
| 6,915,403 | B2* | 7/2005 | Yamamoto et al. | 711/202 |
| 2002/0112043 | A1* | 8/2002 | Kagami et al. | 709/223 |
| 2002/0133512 | A1* | 9/2002 | Milillo et al. | 707/204 |
| 2003/0140209 | A1* | 7/2003 | Testardi | 711/203 |
| 2003/0229645 | A1* | 12/2003 | Mogi et al. | 707/102 |
| 2004/0080558 | A1* | 4/2004 | Blumenau et al. | 347/19 |
| 2004/0250021 | A1* | 12/2004 | Honda et al. | 711/114 |
| 2005/0108304 | A1* | 5/2005 | Wilson et al. | 707/204 |
| 2005/0138308 | A1* | 6/2005 | Morishita et al. | 711/162 |
| 2005/0144199 | A2* | 6/2005 | Hayden | 707/204 |
| 2005/0228950 | A1* | 10/2005 | Karr | 711/114 |
| 2005/0235074 | A1* | 10/2005 | Serizawa et al. | 710/38 |
| 2005/0278465 | A1* | 12/2005 | Qi | 710/36 |
| 2006/0069862 | A1* | 3/2006 | Kano | 711/114 |

* cited by examiner

*Primary Examiner* — Matt Kim
*Assistant Examiner* — Hal Schnee
(74) *Attorney, Agent, or Firm* — Daly, Crowley, Mofford & Durkee, LLP (57) ABSTRACT

Methods and systems are disclosed that enable data migration from a source logical volume to a target logical volume in signal communication with the source logical volume with minimal disruption to the accessibility of that data. The coherency of data on the source logical volume and the target logical volume is confirmed. A first pseudoname is unmapped from a source logical volume identifier, and a second pseudoname is unmapped from a target logical volume identifier. A logical volume identifier includes information specific to the logical volume it identifies. The first pseudoname is then mapped to the target logical volume identifier.

21 Claims, 9 Drawing Sheets

Before migration:

Pseudo name=emcpower48a
       Symmetrix ID=000187910233
       Logical device ID=02C2

Pseudo name=emcpower59a
       Symmetrix ID=000187431312
       Logical device ID=02C6

FIG. 9

After migration:

Pseudo name=emcpower48a
       Symmetrix ID=000187431312
       Logical device ID=02C6

Pseudo name=emcpower59a
       Symmetrix ID=000187910233
       Logical device ID=02C2

METHODS AND SYSTEMS FOR MIGRATING DATA WITH MINIMAL DISRUPTION

BACKGROUND

Figure 1:
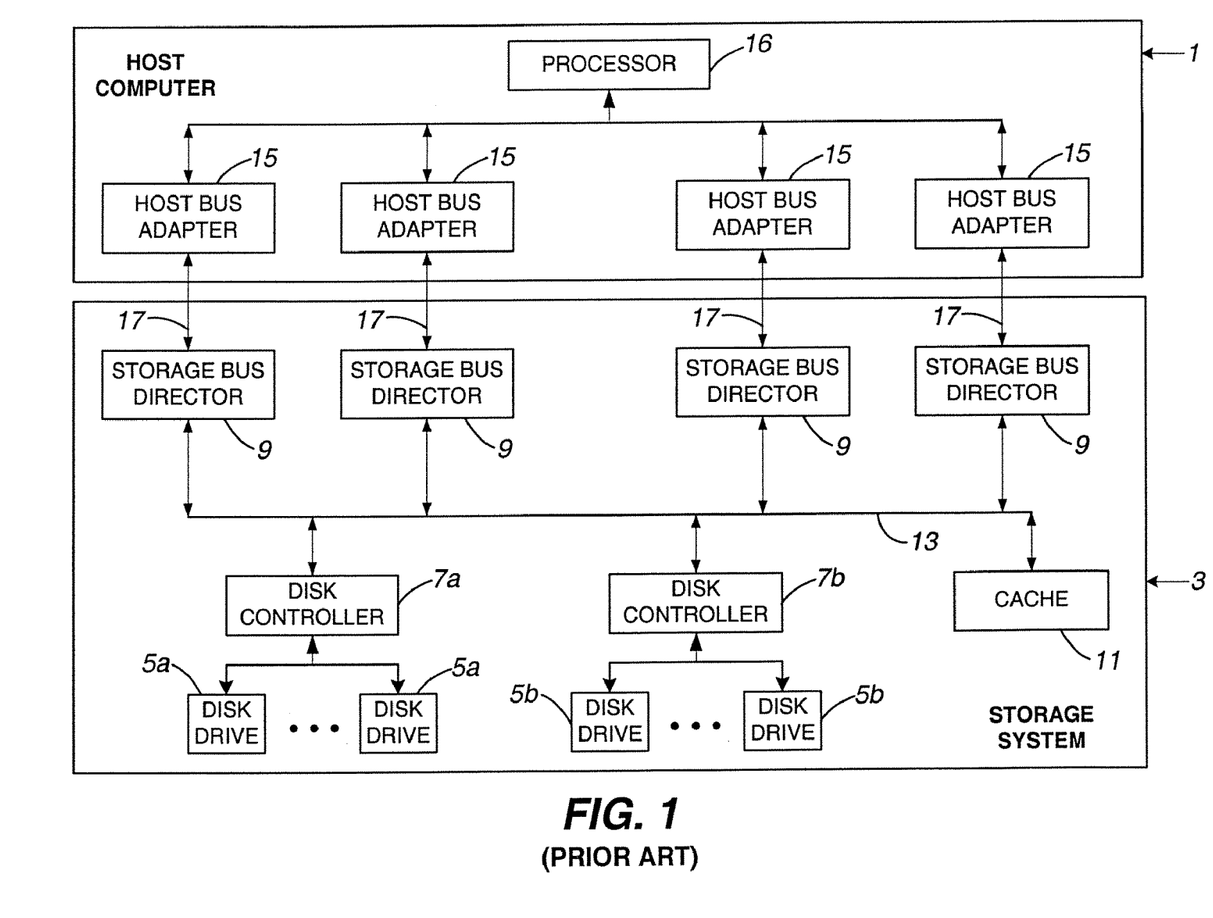
FIG. 1 is a block diagram of an illustrative multi-path computing system on which aspects of the present invention can be implemented.

Many computer systems include one or more host computers and one or more resources accessible by the host computers. One type of computer system resource is a storage system that stores data used by one or more of the host computers. FIG. 1 illustrates an exemplary computer system including a host computer 1 and a storage system 3.

The storage system 3 includes a plurality of disk drives 5a-b, and a plurality of disk controllers 7a-7b that respectively control access to the disk drives 5a and 5b. The storage system 3 further includes a plurality of storage bus directors 9 that control communication with the host computer 1 over communication buses 17. The storage system 3 further includes a cache 11 to provide improved storage system performance. In particular, when the host computer 1 executes a read from the storage system 3, the storage system 3 may service the read from the cache 11 (when the data is stored in the cache), rather than from one of the disk drives 5a-5b, to execute the read more efficiently. Similarly, when the host computer 1 executes a write to the storage system 3, the corresponding storage bus director 9 can execute the write to the cache 11. Thereafter, the write can be destaged asynchronously, in a manner transparent to the host computer 1, to the appropriate one of the disk drives 5a-5b. Finally, the storage system 3 includes an internal bus 13 over which the storage bus directors 9, disk controllers 7a-7b and the cache 11 communicate.

The host computer 1 includes a processor 16 and one or more host bus adapters 15 that each controls communication between the processor 16 and the storage system 3 via a corresponding one of the communication buses 17. It should be appreciated that rather than a single processor 16, the host computer 1 can include multiple processors. Each bus 17 can be any of a number of different types of communication links, with the host bus adapter 15 and the storage bus directors 9 being adapted to communicate using an appropriate protocol for the communication bus 17 coupled therebetween. For example, each of the communication buses 17 can be implemented as a SCSI bus, with the directors 9 and adapters 15 each being a SCSI driver. Alternatively, communication between the host computer 1 and the storage system 3 can be performed over a Fibre Channel fabric or using iSCSI.

As shown in the exemplary system of FIG. 1, some computer systems employ multiple paths for communicating between the host computer 1 and the storage system 3. In some such systems, a host bus adapter 15 has the ability to access each of the disk drives 5a-b, through the appropriate storage bus director 9 and disk controller 7a-b. It should be appreciated that providing such multi-path capabilities enhances system performance, in that multiple communication operations between the host computer 1 and the storage system 3 can be performed simultaneously. A multi-path computer may also be attractive due to the increased likelihood that a resource will be available at any time via an available path.

In a computer system featuring multiple paths between the host computer 1 and a system resource such as the storage system 3, some facility is typically required to enable the host computer 1 to recognize that multiple paths have been formed to the same storage devices within the storage system. The operating system on the host computer 1 typically will view the storage system 3 as having four times its actual number of disk drives 5a-b, since four separate paths are provided to each of disk drives 5a-b. Thus, such a computer system typically further requires a facility for managing the available paths. U.S. Pat. No. 6,629,189 discloses various methods and apparatus for managing devices in a computer system that are accessible via multiple paths.

Data storage devices such as disk drives 5a-5b may be presented to one or more hosts, such as host computer 1, as a logical volume. A logical volume can represent a particular physical storage device, such as one of disk drives 5a-5b. A logical volume may also be referred to as a logical unit. An identifier of a logical volume, also called a logical volume identifier, includes information specific to the logical volume it identifies. One example of a logical volume identifier is the Fibre Channel World Wide Names (WWN) of the logical volume. Another example of a logical volume identifier is information that was assigned by the volume manufacturer and that is provided in response to a SCSI inquiry.

At times, there may be reasons to move data from one area of storage system 3 to another or from one storage system to another. For example, the user may want to upgrade the technology in a storage system or upgrade the storage system as whole. The user may want to replace an old device that may be near the end of its expected life. For another example, the user may implement an information life cycle management tool.

Data migrations typically require applications to be taken offline. Thus, data migrations must occur in periods during which data need not be accessible. Application-users, however, may want data to be accessible most of the time. Accordingly, the time window during which data may be migrated is often quite limited. Thus, planning and managing large-scale data migration can be a significant challenge.

SUMMARY OF EXEMPLARY EMBODIMENTS

Methods and systems are disclosed that relate to the migration of data within a storage system or between storage systems with a minimal disruption to the availability of that data.

One embodiment consistent with principles of the invention is a method for enabling migration of data from a source logical volume to a target logical volume in signal communication with the source logical volume. An application can be accessing data on the source logical volume through a first pseudoname mapped to an identifier of the source logical volume. The coherency of data on the source logical volume and the target logical volume is confirmed. The first pseudoname is unmapped from the source logical volume identifier, and a second pseudoname is unmapped from the target logical volume identifier. The source logical volume identifier includes information specific to the source logical volume. The target logical volume identifier includes information specific to the target logical volume. The first pseudoname is then mapped to the target logical volume identifier. Mapping, as used herein, refers to a one-to-one association with possible intermediate associations such that one can uniquely identify one entity from another entity to which it is mapped.

Another embodiment consistent with principles of the invention is a host computer in signal communication via a network with a source logical volume and a target logical volume. The source logical volume and target logical volume can be included in a single storage system or in different storage systems. The host computer is configured with instructions to perform a method for enabling migration of data from the source logical volume to the target logical volume.

Another embodiment consistent with principles of the invention is a computer-readable medium including instructions to configure a computer system to execute a method for enabling migration of data from the source logical volume to the target logical volume. In one embodiment, the medium includes a program for installation and execution on a host computer associated with a storage system containing data to be migrated.

Additional embodiments consistent with principles of the invention are set forth in the detailed description which follows or may be learned by practice of methods or use of systems or articles of manufacture disclosed herein. It is understood that both the foregoing general description and the following detailed description are exemplary and explanatory only, and are not restrictive of the invention as claimed.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings.

DETAILED DESCRIPTION

The inventors of the present invention recognized that a method or system that would enable the migration of data with minimal disruption would have value.

Reference is now made in detail to illustrative embodiments of the invention, examples of which are shown in the accompanying drawings.

Figure 2:
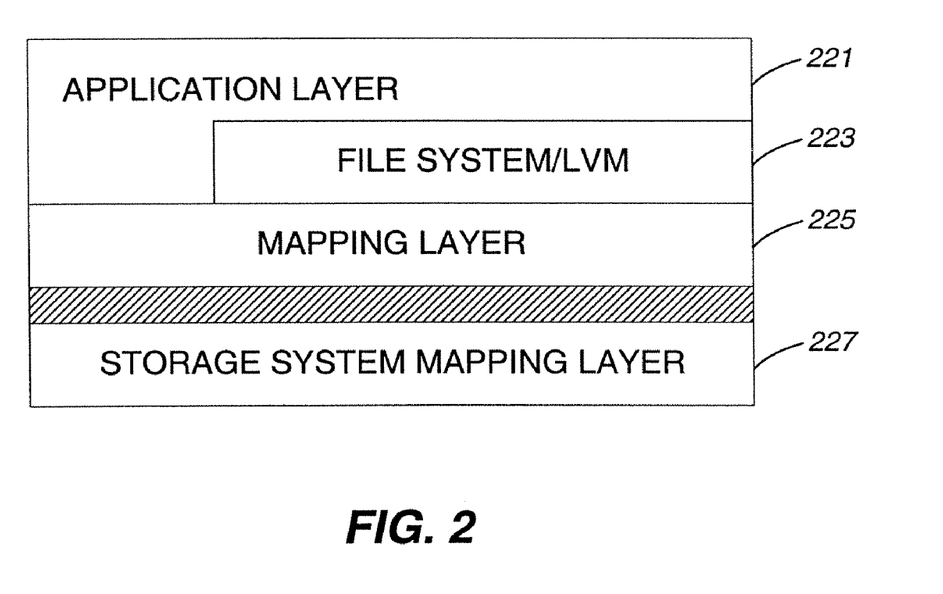
FIG. 2 is a schematic representation of a number of mapping layers that exist in the multi-path computing system of FIG. 1.

FIG. 2 is a schematic representation of a number of mapping layers that may exist in a multi-path computer system, such as illustrated in FIG. 1. The system includes an application layer 221 which includes application programs executing on the processor 16 of the host computer 1. The application layer 221 generally will refer to storage locations used thereby with a label or identifier such as a file name, and will have no knowledge about where the file is physically stored on the storage system 3 (FIG. 1). Below the application layer 221 is the file system/LVM layer 223 that maps the label or identifier specified by the application layer 221 to a logical volume that the host computer 1 perceives to correspond directly to a physical device address (e.g., the address of one of the disk drives 5a-b) within the storage system 3. The file system/LVM layer 223 includes the file system, logical volume manager (LVM) and/or database manager.

In FIG. 2, a mapping layer 225 is provided below the application layer 221 and the file system/LVM layer 223. In the example of FIG. 2, mapping layer 225 is a multi-path mapping layer that maps the logical volume address specified by the file system/LVM layer 223, through a particular one of the multiple system paths, to the logical volume identifier to be presented to the storage system 3. Thus, the multi-path mapping layer 225 not only specifies a particular logical volume identifier, but also specifies a particular one of the multiple system paths to access the specified logical volume. Alternatively, as shown in FIG. 2, mapping layer could communicate directly with application layer 221 or with some applications within application layer 221.

The logical volume identified by mapping layer 225 can be a particular physical device (e.g., one of disk drives 5a-b) within the storage system 3. However, if the computer system includes an intelligent storage system such as illustrated in FIG. 1, the storage system 3 itself may include a further mapping layer 227, such that the logical volume identifier passed from the host computer 1 may not correspond directly to an actual physical device (e.g., a disk drive 5a-b) on the storage system 3. Rather, a logical volume identified by the host computer 1 can be spread across multiple physical storage devices (e.g., disk drives 5a-b), or multiple logical volumes accessed by the host computer 1 can be stored on a single physical storage device.

The multi-path mapping layer 225 of FIG. 2 performs two functions. First, it controls which of the multiple system paths is used for each access by the host computer 1 to a logical volume. Second, the multi-path mapping layer 225 also reduces the number of logical volumes visible to the file system/LVM layer 223. In particular, for a system including X paths between the host computer 1 and the storage system 3, and Y logical volumes defined on the storage system 3, the host bus adapters 15 see X times Y logical volumes. However, the multi-path mapping layer 225 reduces the number of logical volumes visible to the file system/LVM layer 223 to equal only the Y distinct logical volumes that actually exist on the storage system 3.

In the present invention, pseudonames are used. A pseudoname represents at least one logical volume in a manner that is independent of the paths by which the logical volume is accessible. Embodiments of the invention feature a pseudoname that is independent of the logical volume identifier to which it is mapped. Pseudonames can be implemented in any of numerous ways, as the present invention is not limited to any particular implementation. U.S. Pat. No. 6,629,189, which is hereby incorporated by reference, discloses various methods and apparatus for managing devices in a multi-path computer system with pseudonames.

Figure 3:
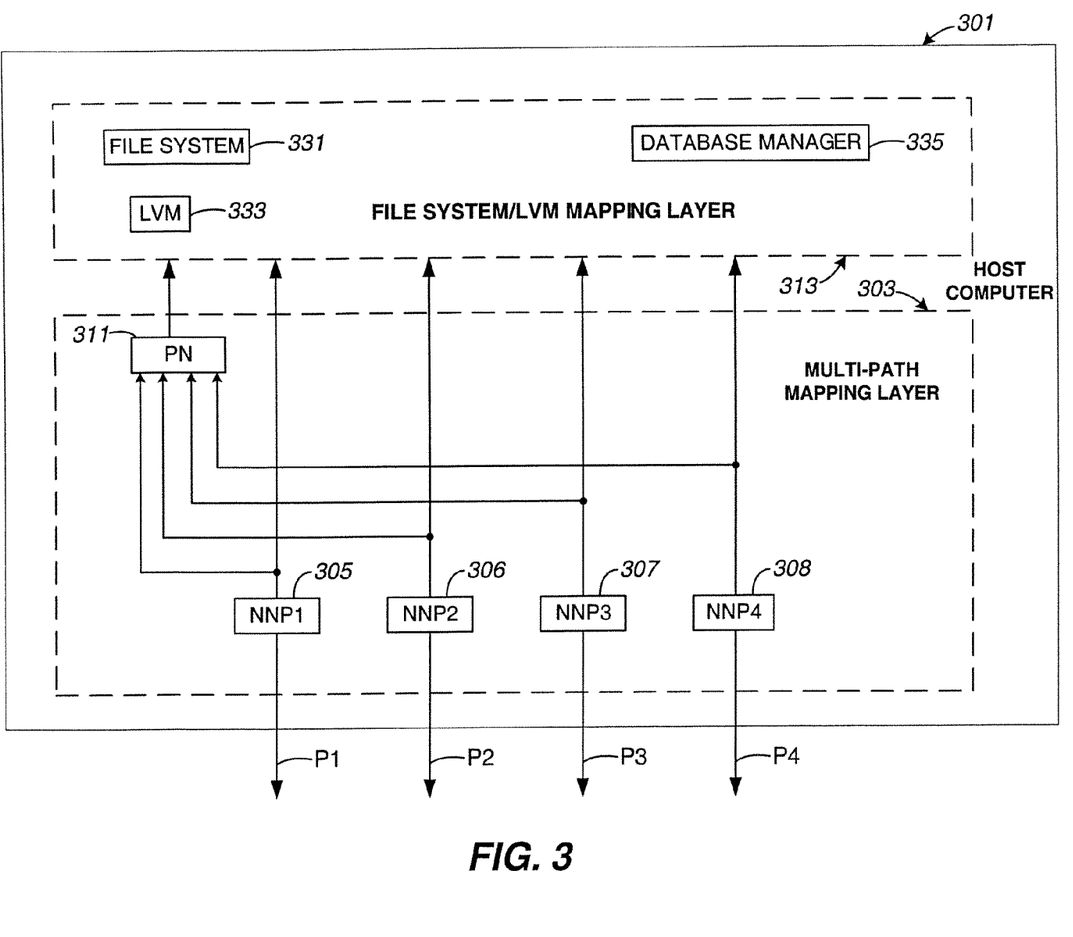
FIG. 3 is a conceptual illustration of the manner in which logical volumes are managed with pseudonames.

In the embodiment of the present invention illustrated in FIG. 3, pseudonames are implemented via the multi-path mapping layer 303. FIG. 3 illustrates a host computer 301 that is similar in most respects to the host computer 1 shown in FIG. 1. The host computer 301 includes four paths P1-P4 for communicating with a system resource such as the storage system 3 (FIG. 1). In FIG. 3, a single logical volume is represented as being accessible over each of the paths P1-P4, and is designated with four distinct native names 305-308, with native name 305 being labeled NNP1 to designate that it is the native name for path P1, native name 306 being designated NNP2 to designate that it is the native name for path P2, etc. The multi-path mapping layer 303 can provide a pseudoname for every system resource accessible by the host computer 301 (e.g., each logical volume from the storage system 3). Thus, the multi-path mapping layer 303 creates a single pseudoname 311 for the logical volume. The pseudoname 311 is made visible to the file system/LVM layer 223. The multi-path mapping layer 303 further includes metadata that maps each pseudoname 311 provided for a particular logical volume to the native names 305-308 that identify the paths through which the logical volume can be accessed.

When storage system 3 is from the SYMMETRIX line of disk arrays available from EMC Corporation, Hopkinton, Mass., for example, each logical volume is assigned a unique logical volume identifier by storage system 3. This identifier is independent of the path used to access the logical volume, and as such, is independent of the physical configuration of the system. The multi-path mapping layer 303 can employ such an identifier to uniquely identify each of the logical volumes.

Figure 4:
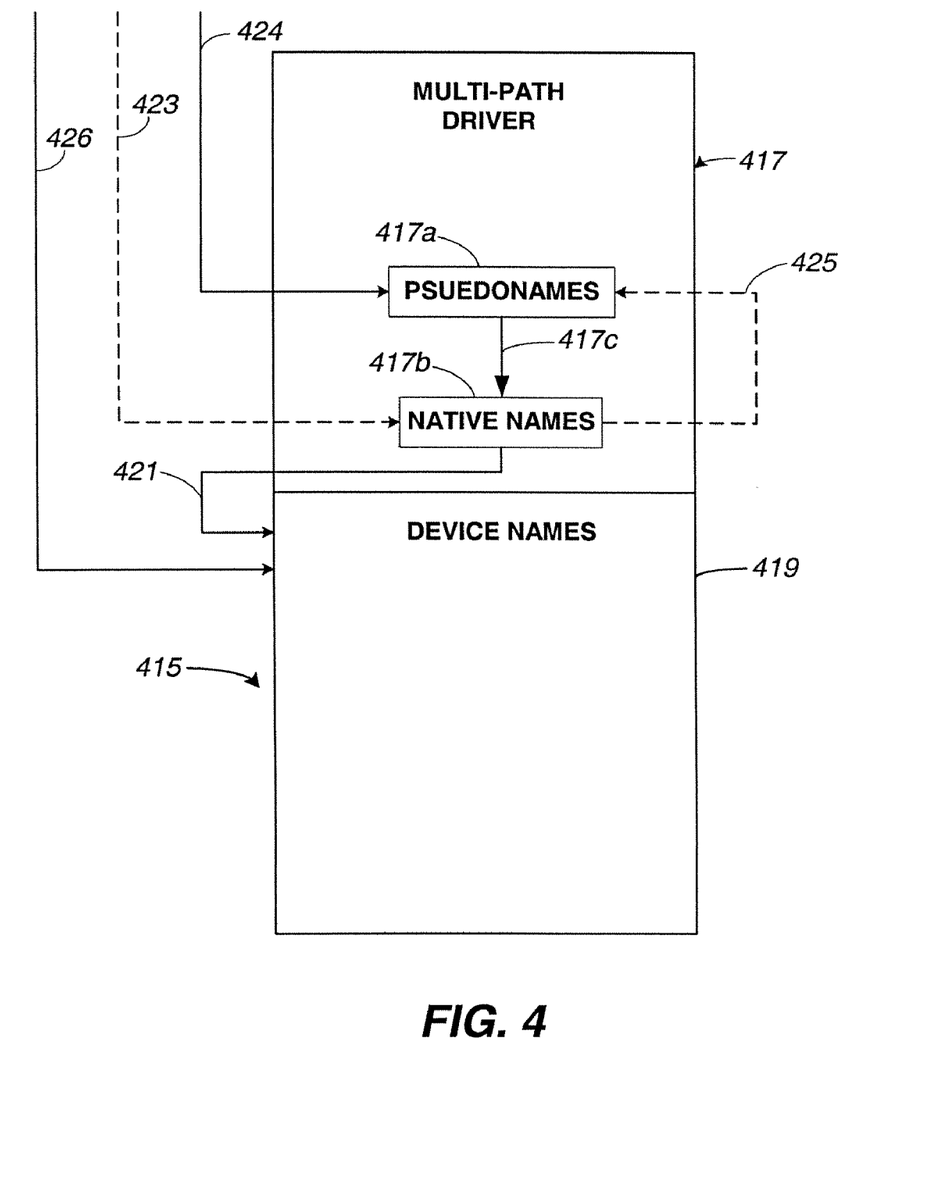
FIG. 4 is a schematic representation of the I/O stack in accordance with one illustrative embodiment of the present invention.

FIG. 4 conceptually illustrates the I/O stack 415 in the host computer 301 of FIG. 3, which enables pseudonames to be visible to the file system/LVM mapping layer 313. The I/O stack 415 receives I/O commands passed from the application layer 221 (FIG. 2) through the file system/LVM layer 313, and includes a driver 417 and a group of device drivers 419. The device drivers 419 are the lowest level in the I/O stack, and control physical devices (e.g., the host bus adapters 15 in FIG. 1) to implement the passing of I/O commands between the host computer 301 and a system resource such as the storage system 3 shown in FIG. 1.

Driver 417 can be, for example, a multi-path driver that implements the multi-path capabilities of the multi-path mapping layer 303 on the host computer 301. The entry point 417a enables the multi-path driver 417 to respond to I/O commands from the file system/LVM layer 223 that are directed to pseudonames (represented in FIG. 4 by arrow 424). When it receives an I/O command accessing a pseudoname, the multi-path driver 417 selects one of the physical paths P1-P4 to service the I/O command by routing the I/O command to the appropriate one of the native names 305-308 (FIG. 3), as evidenced by the arrow 417c in FIG. 4. The selection of which of the paths P1-P4 (FIG. 3) to employ can be done in any of numerous ways (e.g., using a load balancing technique), as the present invention is not limited to any particular path selection technique. Once a particular path is selected, the I/O command is passed to the appropriate one of the device drivers 419, as indicated by the arrow 421 in FIG. 4.

The functions performed by the multi-path driver 417 and multi-path layer 303 can be implemented within the processor 16 (FIG. 1) in the host computer 301. Alternatively, the multi-path driver can be implemented elsewhere in the host computer 301.

Although the invention can be implemented in a computer system featuring multipath connections, such connections are not necessary to the implementation of the invention. For example, host computer 1 can have a single mapping layer and applications can interact with that mapping layer.

Figure 5:
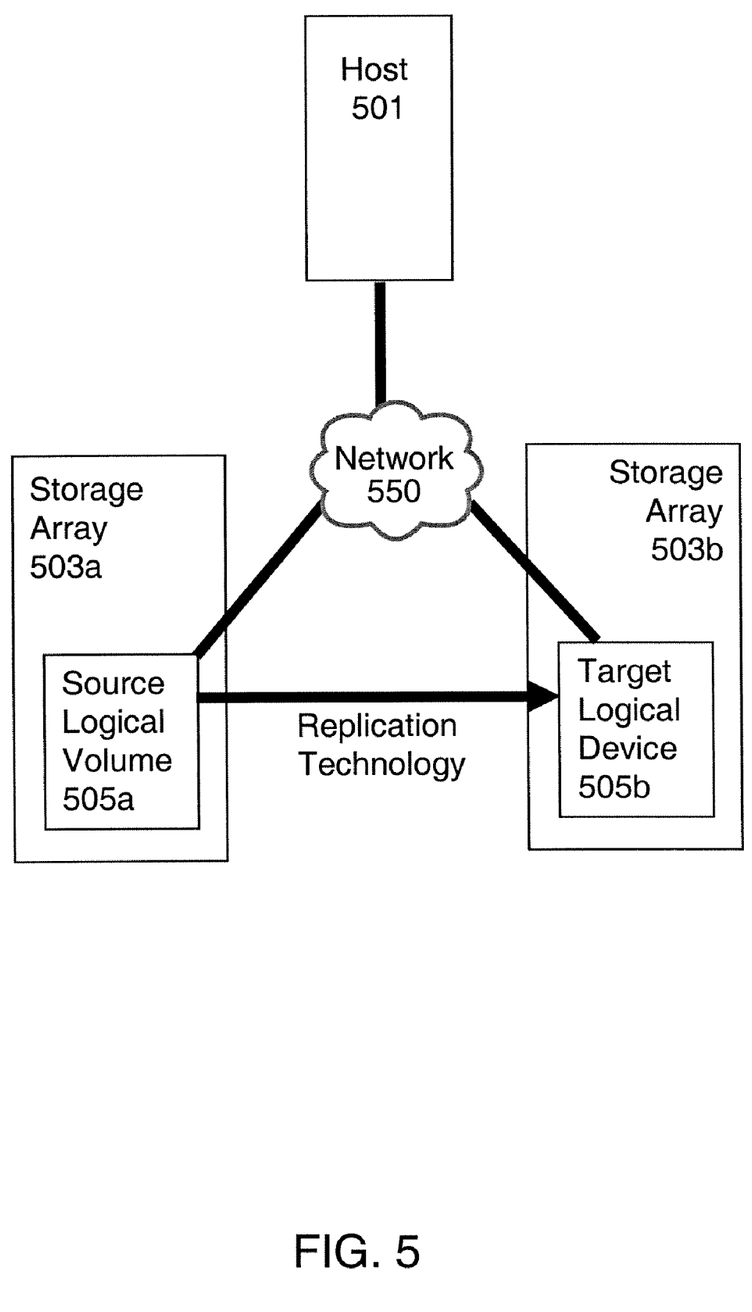
FIG. 5 illustrates exemplary components of a computer system involved in migrating data consistent with features and principles of the present invention.

FIG. 5 illustrates exemplary components of a computer system involved in migrating data consistent with features and principles of the present invention. FIG. 5 illustrates a host 501 and two storage arrays 503a and 503b in signal communication with each other. The host 501 may be similar to host computer 1 of FIG. 1 and may include the features described with respect to host computer 301 of FIG. 3. The host 501 can communicate with each of the two storage arrays 503a, 503b via a network 550. The network 550 can be, for example, a storage area network. The storage area network may be accessed, for example, over a Fibre channel switching fabric using encapsulated SCSI protocols.

Each storage array 503 includes a logical volume 505. Each storage array 503 can be a storage system, such as storage system 3 of FIG. 1. Alternatively, each storage array 503 can be a component of a larger storage system. Although FIG. 5 illustrates the logical volumes 505a and 505b as physical components of different arrays, they may be different logical volumes within the same array consistent with features and principles of the present invention. Additionally, a logical volume 505 may not correspond directly to an actual physical device, such as disk drive 5a of FIG. 1. For example, a single logical volume 505 may be spread across several physical devices. Consistent with features and principles of the present invention, the components illustrated in FIG. 5 are used when data is migrated from the source logical volume 505a to the target logical volume 505b.

Figure 6:
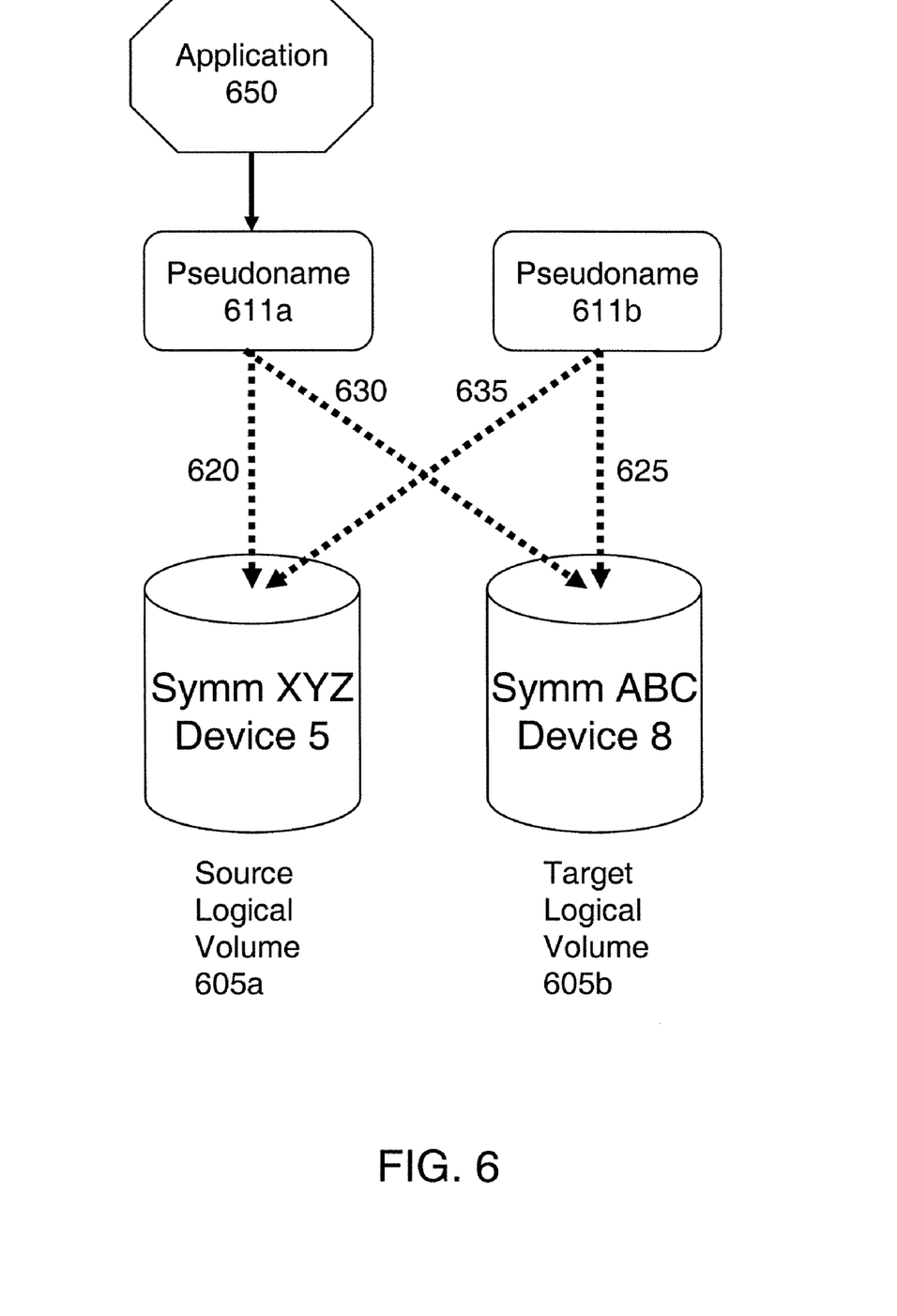
FIG. 6 illustrates an exemplary group of elements in a computer system involved in migrating data consistent with features and principles of the present invention.

FIG. 6 illustrates an exemplary group of elements in a computer system involved in migrating data consistent with features and principles of the present invention. The inventors of the present invention recognized that pseudonames can be used to enable migration of data with minimal disruption to the availability of that data.

FIG. 6 illustrates two pseudonames 611a, 611b and two logical volumes 605a, 605b. Each logical volume 605 can be a logical volume 505, such as described above with respect to FIG. 5. In FIG. 6, source logical volume 605a is identified as "Symm XYZ Device 5" and target logical volume 605b is identified as "Symm ABC Device 8." Each pseudoname 611 is preferably selected to be independent of the physical configuration of the system. Each pseudoname 611 is independent of any path by which a logical volume is accessible. Each pseudoname 611 is independent of any logical volume identifier.

Prior to migration in FIG. 6, each pseudoname 611 has been mapped to an identifier of one logical volume 605. Lines 620 and 625, for example, may respectively represent the mappings before a data migration—specifically, the mapping of pseudoname 611a to source logical volume 605a and the mapping of pseudoname 611b to target logical volume 605b. Line 620 enables an application 650 to access the data on source logical volume 605a with pseudoname 611a. During migration, the data on source logical volume 605a preferably remains accessible with pseudoname 611a. After migration, the pseudoname 611a of the source logical volume 605a is mapped to the target logical volume 605b. Typically, the pseudoname 611b of the target logical volume 605a is also mapped to the source logical volume 605a. Lines 630 and 635, for example, may respectively represent the mappings after a data migration—specifically, the mapping of pseudoname 611a to target logical volume 605b and the mapping of pseudoname 611b to source logical volume 605a.

Consistent with features and principles of the present invention, data migration as illustrated in FIG. 6 requires no change to be made to the file system/LVM mapping layer 313 of FIG. 3. Similarly, data migration as illustrated in FIG. 6 requires no change to be made to the application layer 221 of FIG. 2. Instead, a mapping between a pseudoname and a logical volume identifier within mapping layer 225 of FIG. 2 can be modified in connection with a data migration. It should be appreciated that this is a significantly easier task than modifying the file system/LVM mapping layer 313, where the metadata for a number of different entities in the mapping layer 313 may need to be modified. It should also be appreciated that this is a significantly easier task than modifying application layer 221, which could include third party software.

Figure 7:
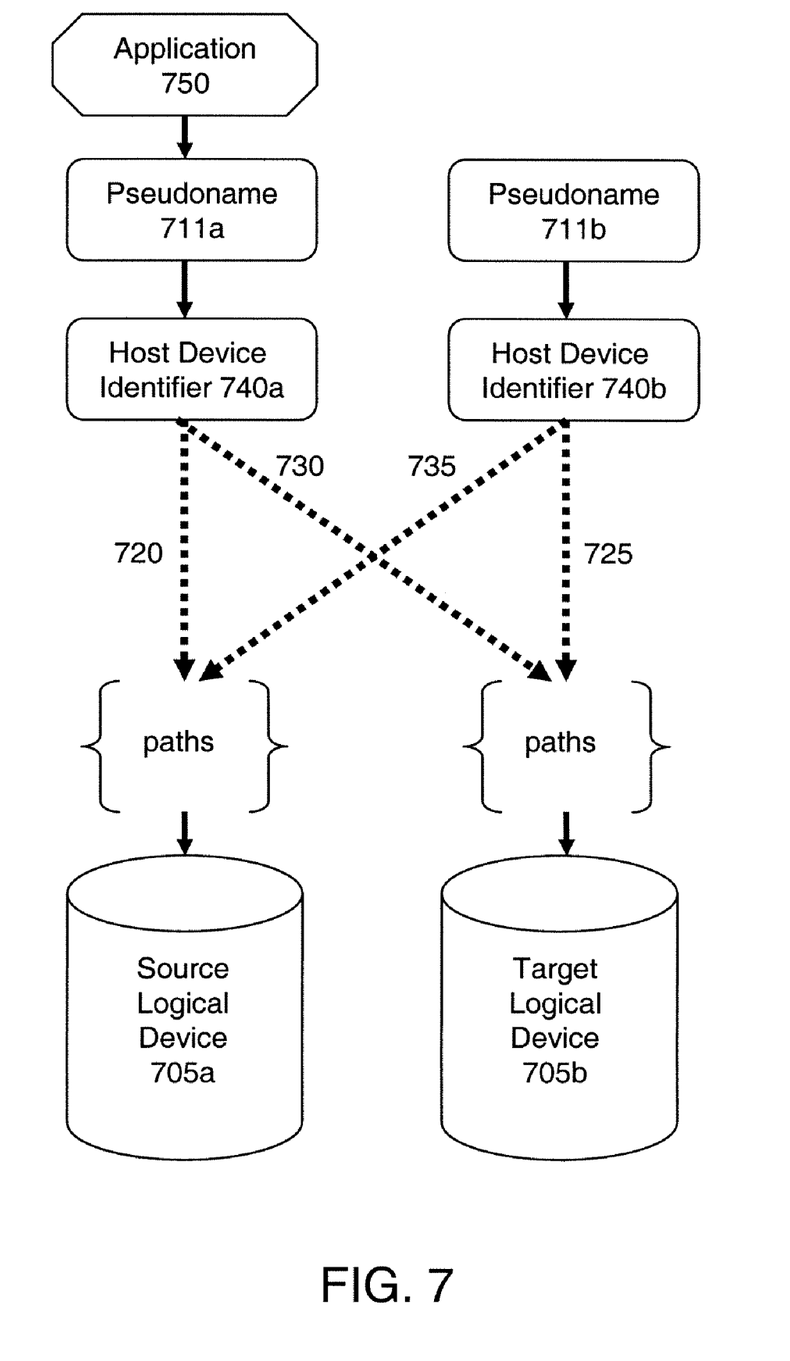
FIG. 7 illustrates another exemplary group of elements in a computer system involved in migrating data consistent with features and principles of the present invention.

FIG. 7 illustrates another exemplary group of elements in a computer system involved in migrating data consistent with features and principles of the present invention. FIG. 7 illustrates two pseudonames 711*a*, 711*b*; two host device identifiers 740*a*, 740*b*; two logical volumes 705*a*, 705*b*, and at least one path by which each of the logical volumes 705*a*, 705*b* is accessible. Each logical volume 705 is identified by a logical volume identifier. Consistent with features and principles of the present invention, a host device identifier 740 is an access point by which the host operating system can access a logical volume. A host device identifier 740 for the SOLARIS operating system (available from Sun Microsystems Inc.), for example, is a major/minor number pair that specifies a driver and a device. An exemplary host device identifier for the SOLARIS operating system specifies mapping driver 417 and a device which corresponds to the relevant logical volume.

In FIG. 7, each host device identifier 740 is mapped to one pseudoname 711 and to one logical volume 705. A mapping between a host device identifier 740 and a logical volume 705, as illustrated in FIG. 7, includes at least one path by which the logical volume 705 is accessible. The mappings between a host device identifier 740 and a logical volume 705 in FIG. 7 specifically include a plurality of paths by which the logical volume 705 is accessible. Thus, each pseudoname 711 is mapped to one logical volume 705, albeit indirectly. In FIG. 7, host device identifier 740*a* is mapped to pseudoname 711*a* and host device identifier 740*b* is mapped to pseudoname 711*b*.

Lines 720 and 725, for example, may respectively represent mappings before a data migration—specifically, the mapping of host device identifier 740*a* to one or more paths to source logical volume 705*a* and the mapping of host device identifier 740*b* to one or more paths to target logical volume 705*b*. Line 720 enables an application 750 to access the data on source logical volume 705*a* with pseudoname 711*a*, its mapping to host device identifier 740*a*, and one or more paths to source logical device 705*a*. During migration, the data on source logical volume 705*a* preferably remains accessible with pseudoname 711*a* and its mappings to host device identifier 740*a*. After migration, the pseudoname 711*a* remains mapped to host device identifier 740*a*, but host device identifier 740*a* is mapped to one or more paths to the target logical volume 705*b*. Typically, the host device identifier 740*b* is also mapped to the one or more paths to the source logical volume 705*a*. Lines 730 and 735, for example, may respectively represent mappings after a data migration—specifically, the mapping of host device identifier 740*a* to the one or more paths to the target logical volume 705*b* and the mapping of host device identifier 740*b* to the one or more paths to the source logical volume 705*a*.

Consistent with features and principles of the present invention, data migration as illustrated in FIG. 7 requires no change to be made to the file system/LVM mapping layer 313 of FIG. 3. Similarly, data migration as illustrated in FIG. 6 requires no change to be made to the application layer 221 of FIG. 2. Instead, a mapping between a host device identifier 740 and the at least one path by which the logical volume is accessible within mapping layer 225 of FIG. 2 can be modified in connection with a data migration. Alternatively, an additional mapping layer can be used to manage the mappings between the host device identifiers and the one or more paths to a single logical volume or the mappings between a host device identifier 740 and the at least one path by which a logical volumes is accessible.

Figure 8:
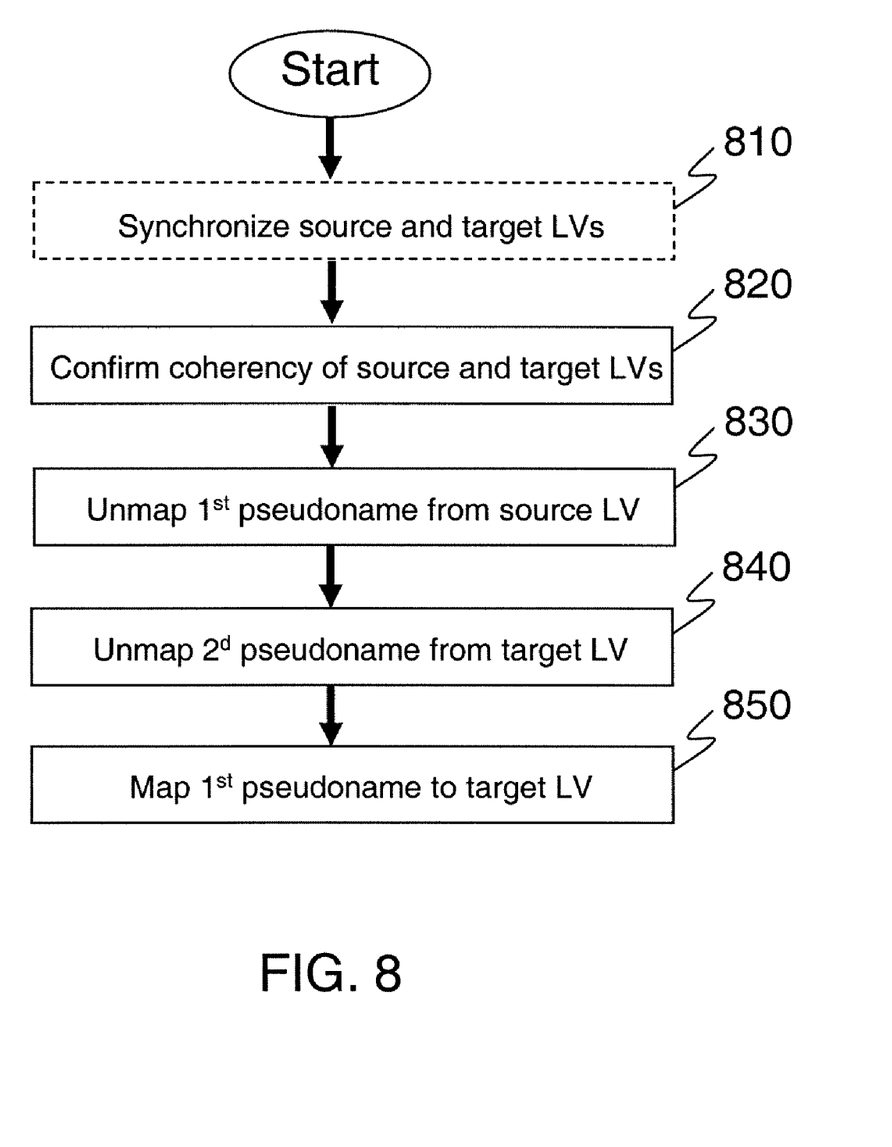
FIG. 8 illustrates a flow chart of an exemplary method for migrating data consistent with features and principles of the present invention.

FIG. 8 illustrates a flow chart of an exemplary method for enabling migration of data from a source logical volume to a target logical volume consistent with features and principles of the present invention. Prior to stage 810, source and target logical volume have been identified and each has been mapped to a pseudoname. In the example illustrated in FIG. 6, pseudoname 611*a* has been mapped to source logical volume 605*a* (i.e., creating line 620) and pseudoname 611*b* has been mapped to target logical volume 605*b* (i.e., creating line 625). Application 650 may access source logical volume 605*a* using the mapping represented by line 620. In the example illustrated in FIG. 7, pseudoname 711*a* has been mapped to source logical volume 705*a* via host device identifier 740*a*, line 720, and the at least one path by which source logical volume 705*a* is accessible. Application 750 may access source logical volume 705*a* using that mapping.

In optional stage 810, the data on the target logical volume is synchronized with the data on the source logical volume. In this stage, data is copied from the source logical volume onto the target logical volume. Known replication technology, such as the OPEN REPLICATOR tool for the SYMMETRIX line of disk arrays (available from EMC Corp.), can be used for synchronization. In some applications of the invention, the majority of data on the source logical volume 505*a* can be transmitted to the target logical volume 505*b* for storage via network 550. For example, where the components illustrated in FIG. 5 are involved, the OPEN REPLICATOR tool can be used to "hot pull" the majority of data from the source logical volume 505*a* onto the target logical volume 505*b* for storage via network 501. In this example application, host 501 could transmit the same writes to the source logical volume 505*a* and the target logical volume 505*b* via network 501. In alternative applications of the invention, data on the source logical volume 505*a* can be transmitted to the target logical volume 505*b* for storage via host. Where the source and target logical volumes are located within a single array, data can be transmitted from the source logical volume to the target logical volume without involving a network or a host. During the synchronization, an application on host 501 may have continued access to the information on source logical volume 505*a*.

In stage 820, the coherency of data on the source logical volume and the target logical volume is confirmed. Where optional stage 810 is included in the method of FIG. 8, confirming coherency could, for example, include simply receiving an alert that the synchronization process has been completed. Where the method of FIG. 8 does not include optional state 810, confirming the coherency of data on the source and target logical volumes can simply include confirming that the target logical volume is the source logical volume encapsulated by a virtual storage device. Examples of virtual storage devices include the INVISTA system, which includes the INVISTA application (offered by EMC Corp.) running on a storage and switch controller coupled to an intelligent multiprotocol switch. Nonetheless, more thorough confirmation is likely desirable.

In stage 830, a first pseudoname is unmapped from the source logical volume. In the example illustrated in FIG. 6, stage 830 involves unmapping pseudoname 611*a* from source logical volume 605*a* (i.e., eliminating line 620). In the example illustrated in FIG. 7, stage 830 involves unmapping pseudoname 711*a* from source logical volume 705*a* by unmapping host device identifier 740*a* from the one or more paths by which source logical volume 705*a* is accessible (i.e., eliminating line 720).

In stage 840, a second pseudoname is unmapped from the target logical volume. In the example illustrated in FIG. 6, stage 840 involves unmapping pseudoname 611*b* from target logical volume 605*b* (i.e., eliminating line 625). In the example illustrated in FIG. 7, stage 840 involves unmapping pseudoname 711*b* from target logical volume 705*b* by unmapping host device identifier 740*b* from the one or more paths by which target logical volume 705*b* is accessible (i.e., eliminating line 725).

Consistent with features and principles of the present invention, stage 850 requires a pseudoname, which had been mapped to the source logical volume, to be mapped to the target logical volume. In stage 850, the first pseudoname is mapped to the target logical volume. In the example illustrated in FIG. 6, stage 850 involves mapping pseudoname 611*a* to target logical volume 605*b* (i.e., creating line 630). Pseudoname 611*b* may further be mapped to source logical volume 605*a* (i.e., creating line 635). In the example illustrated in FIG. 7, stage 850 involves mapping pseudoname 711*a* to target logical volume 705*b* by mapping host device identifier 740*a* to the one or more paths by which target logical volume 705*b* is accessible (i.e., creating line 730). Pseudoname may further be mapped to source logical volume 705*a* by mapping host device identifier 740*b* to the one or more paths by which source logical volume 705*a* is accessible (i.e., creating line 735). Stages 830, 840, and 850 can be performed without interrupting an application that may access data on the source logical device. Once stage 850 is complete, the application can access the data on the target logical device without being interrupted or reconfigured.

Figure 9:
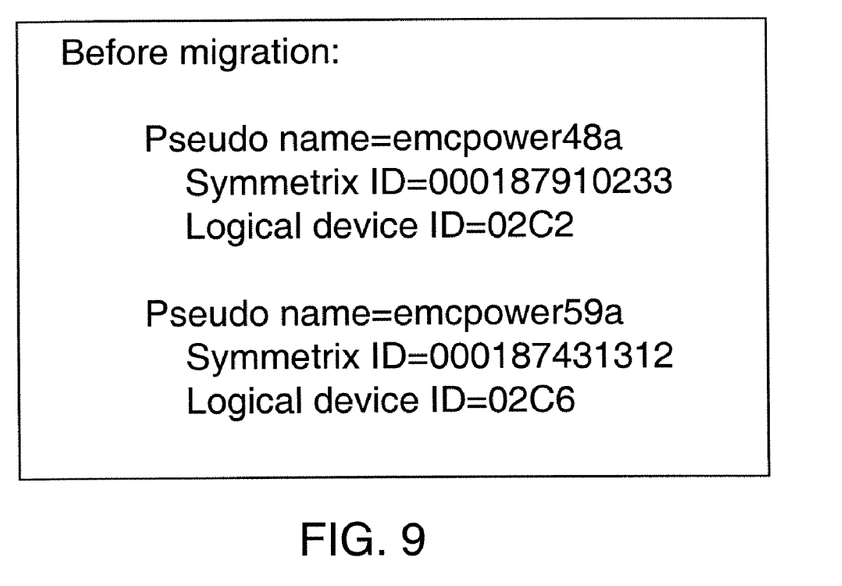
FIG. 9 illustrates a mapping of two logical volumes before a data migration consistent with features and principles of the present invention.

FIG. 9 illustrates a pair of mappings of a pseudoname to a logical volume before a data migration consistent with features and principles of the present invention. In FIG. 9, pseudoname "emcpower48a" is mapped to a logical volume that can be identified by "SYMMETRIX ID 00187910233, Logical Device ID 02C2." Thus, "SYMMETRIX ID 00187910233, Logical Device ID 02C2" is an exemplary logical volume identifier. Similarly, pseudoname "emcpower59a" is mapped to a logical volume that can be identified by "SYMMETRIX ID 00187431312, logical volume 02C6."

Figure 10:
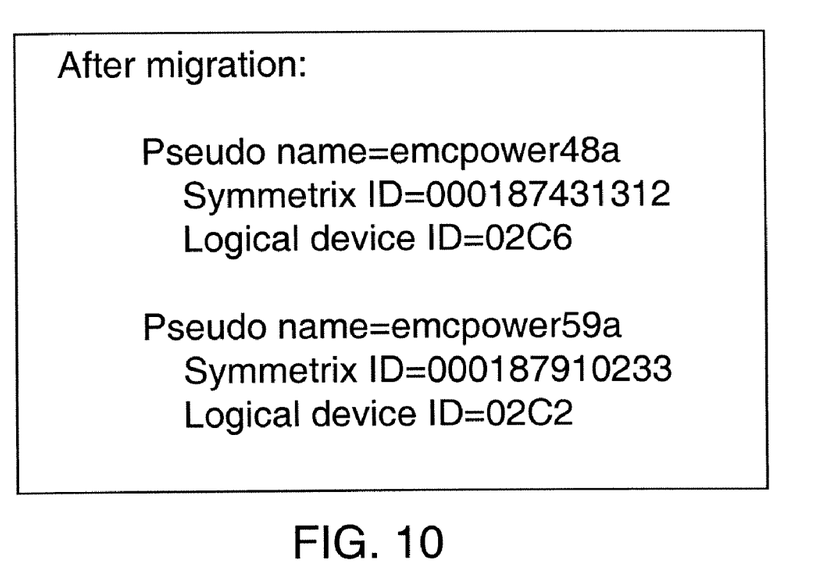
FIG. 10 illustrates a mapping of two logical volumes after a data migration consistent with features and principles of the present invention.

FIG. 10 illustrates an exemplary mapping of the logical volumes of FIG. 9 after a data migration consistent with features and principles of the present invention. In FIG. 10, pseudoname "emcpower48a" is mapped to a logical volume that can be identified by "SYMMETRIX ID 00187431312, logical volume 02C6." Similarly, pseudoname "emcpower59a" is mapped to a logical volume that can be identified by "SYMMETRIX ID 00187910233, Logical Device ID 02C2." After the migration consistent with the invention, the pseudonames of FIG. 9 are still used, but they are mapped to different logical volumes.

The embodiments and aspects of the invention set forth above are only exemplary and explanatory. They are not restrictive of the invention as claimed. Other embodiments consistent with features and principles are included in the scope of the present invention. As the following sample claims reflect, inventive aspects may lie in fewer than all features of a single foregoing disclosed embodiment. Thus, the following claims are hereby incorporated into this description, with each claim standing on its own as a separate embodiment of the invention.

What is claimed is:

1. A method for enabling migration of data from a source logical device to a target logical device, wherein the source logical device is in signal communication with the target logical device, the method comprising:
   confirming the coherency of data on the source logical device and the target logical device;
   unmapping a first pseudoname from a source logical device identifier, wherein the source logical device identifier comprises information specific to the source logical device;
   wherein, prior to unmapping, the first pseudoname represents the source logical device in a manner that is independent of the physical paths by which the source logical device is accessible from a host computer, wherein each of the physical paths has a respective distinct native name, wherein the host computer includes mapping layers comprising a storage system mapping layer lower than a multi-path mapping layer, which is lower than a file system/logical volume mapping (LVM) layer and an application layer, wherein the multi-path mapping layer includes a multi-path driver to select one of the physical paths by routing an I/O command to one of the native names, wherein the host computer includes multiple host bus adaptors to provide the multiple physical paths from the host computer to the source logical device identifier, wherein the multi-path mapping layer selects one of the paths on a per access basis;
   unmapping, by the multi-path mapping layer, a second pseudoname from a target logical device identifier, wherein the target logical device identifier comprises information specific to the target logical device; and
   mapping, by the multi-path mapping layer, the first pseudoname to the target logical device identifier,
   wherein the migration, and the steps of unmapping the first pseudoname, unmapping the second pseudoname, and mapping the first pseudoname, are performed by the multi-path mapping layer on the host computer without changes to the file system/LVM layer, wherein the first and second pseudonames are visible to the file system/LVM layer on the host computer,
   wherein the source logical device and the target logical device are physical devices presented to the host computer by the same or different storage arrays.

2. The method of claim 1 further comprising synchronizing the data on the source logical device and the target logical device.

3. The method of claim 2 further comprising transmitting data from the source logical device to the target logical device through a network.

4. The method of claim 2, further comprising synchronizing the data on the source logical device and the target logical device while maintaining the accessibility of the data on the source logical device.

5. The method of claim 1 wherein an application that uses the data on the source logical device addresses the data with the first pseudoname.

6. The method of claim 1 wherein the mapping occurs while an application that uses the data on the source logical device is running.

7. The method of claim 1 wherein the mapping further comprises:
   suspending input/output (I/O) to the data on the source logical device;
   mapping the first pseudoname to the target logical device identifier; and
   resuming I/O to the data on the target logical device.

8. The method of claim 1
wherein, prior to unmapping the first pseudoname from a source logical device identifier, the first pseudoname is mapped to the source logical device identifier via a plurality of paths by which the source logical device is accessible;
wherein, prior to unmapping the second pseudoname from a target logical device identifier, the second pseudoname is mapped to the target logical device identifier via a plurality of paths by which the target logical device is accessible; and
wherein mapping the first pseudoname to the target logical device identifier comprises mapping the first pseudoname to the target logical device identifier via the plurality of paths by which the target logical device is accessible.

9. The method according to claim 1, wherein the source logical volume identifier includes a Fibre Channel World Wide Name of a logical volume.

10. The method according to claim 1, wherein the source logical volume identifier includes information assigned by the volume manufacturer.

11. The method according to claim 1, wherein the source logical device is a SCSI logical unit.

12. A host computer in signal communication via a network with a source logical volume and a target logical volume, wherein the host computer includes stored instructions to enable migration of data from the source logical volume to the target logical volume, comprising instructions for:
confirming the coherency of data on the source logical volume and the target logical volume;
unmapping a first pseudoname from a source logical volume identifier, wherein the source logical volume identifier comprises information specific to the source logical volume;
wherein, prior to unmapping, the first pseudoname represents the source logical volume in a manner that is independent of the physical paths by which the source logical volume is accessible from a host computer, wherein each of the physical paths has a respective distinct native name, wherein the host computer includes mapping layers comprising a storage system mapping layer lower than a multi-path mapping layer, which is lower than a file system/logical volume mapping (LVM) layer and an application layer, wherein the multi-path mapping layer includes a multi-path driver to select one of the physical paths by routing an I/O command to one of the native names, wherein the host computer includes multiple host bus adaptors to provide the multiple physical paths from the host computer to the source logical volume identifier, wherein the multi-path mapping layer selects one of the paths on a per access basis;
unmapping, by the multi-path mapping layer, a second pseudoname from a target logical volume identifier, wherein the target logical volume identifier comprises information specific to the target logical volume; and
mapping, by the multi-path mapping layer, the first pseudoname to the target logical volume identifier,
wherein the source logical volume is provided as a physical device and the target logical volume is provided as a physical device that are presented to the host computer by one or more storage arrays,
wherein the steps of migrating data from the source logical volume, unmapping the first pseudoname, unmapping the second pseudoname, and mapping the first pseudoname are performed by the multi-path mapping layer on the host computer without changes to the file system/LVM layer, wherein the first and second pseudonames are visible to the file system/LVM layer on the host computer.

13. The method of claim 12 further comprising synchronizing the data on the source logical volume and the target logical volume.

14. The method of claim 13 further comprising transmitting data from the source logical volume to the target logical volume through a network.

15. The method of claim 13 further comprising synchronizing the data on the source logical volume and the target logical volume while maintaining the accessibility of the data on the source logical volume.

16. The method of claim 12 wherein confirming the coherency of data on the source logical volume and the target logical volume comprises confirming that the target logical volume comprises the source logical volume encapsulated by a virtual storage device.

17. The method of claim 12 wherein the mapping occurs while an application that uses the data on the source logical volume is running.

18. An article, comprising a computer-readable medium comprising instructions to configure a computer system to execute enabling migration of data from a source logical device to a target logical device by:
confirming the coherency of data on the source logical device and the target logical device;
unmapping a first pseudoname from a source logical device identifier, wherein the source logical device identifier comprises information specific to the source logical device;
wherein, prior to unmapping, the first pseudoname represents the source logical device in a manner that is independent of the physical paths by which the source logical device is accessible from a host computer, wherein each of the physical paths has a respective distinct native name, wherein the host computer includes mapping layers comprising a storage system mapping layer lower than a multi-path mapping layer, which is lower than a file system/logical volume mapping (LVM) layer and an application layer, wherein the multi-path mapping layer includes a multi-path driver to select one of the physical paths by routing an I/O command to one of the native names, wherein the host computer includes multiple host bus adaptors to provide the multiple physical paths from the host computer to the source logical device identifier, wherein the multi-path mapping layer selects one of the paths on a per access basis;
unmapping, by the multi-path mapping layer, a second pseudoname from a target logical device identifier, wherein the target logical device identifier comprises information specific to the target logical device; and
mapping, by the multi-path mapping layer, the first pseudoname to the target logical device identifier,
wherein the migration, and the steps of unmapping the first pseudoname, unmapping the second pseudoname, and mapping the first pseudoname, are performed by the multi-path mapping layer on the host computer without changes to the file system/LVM layer, wherein the first and second pseudonames are visible to the file system/LVM layer on the host computer,
wherein the source logical device and the target logical device are physical devices presented to the host computer by the same or different storage arrays.

19. The article of claim 18 further comprising instructions for synchronizing the data on the source logical device and the target logical device.

20. The article of claim 18 wherein confirming the coherency of data on the source logical device and the target logical device comprises confirming that the target logical device comprises the source logical device encapsulated by a virtual storage device.

21. A method, comprising:
provide, for a multi-path system, in a host computer, a multipath mapping layer lower in an I/O stack than a file system/logical volume mapping (LVM) layer which provides mapping from an application to a logical volume, the multi-path mapping layer to map a pseudoname for a given logical volume to a plurality of native names that identify a respective path from the host computer to the given logical volume storage so that the pseudoname represents the logical volume to the application independently of the path from the host computer to storage for the logical volume, wherein the multi-path mapping layer selects a path to storage on a per access basis;

migrating data from a source logical volume to a target logical volume in the multi-path system, wherein the source logical volume is in signal communication with the target logical volume;

unmapping a first pseudoname for a source logical volume identifier;

unmapping a second pseudoname for a target logical volume identifier; and mapping the first pseudoname to the target logical volume identifier;

wherein the source logical volume is provided as a physical device and the target logical volume is provided as a physical device that are presented to the host computer by one or more storage arrays;

wherein the steps of migrating data from the source logical volume, unmapping the first pseudoname, unmapping the second pseudoname, and mapping the first pseudoname are performed by the multi-path mapping layer on the host computer without changes to the file system/LVM layer, wherein the first and second pseudonames are visible to the file system/LVM layer on the host computer.

* * * * *